April 28, 1942.　　R. L. ANDERSON ET AL　　2,281,059
WINDROW HARVESTER
Filed June 30, 1939　　4 Sheets-Sheet 1
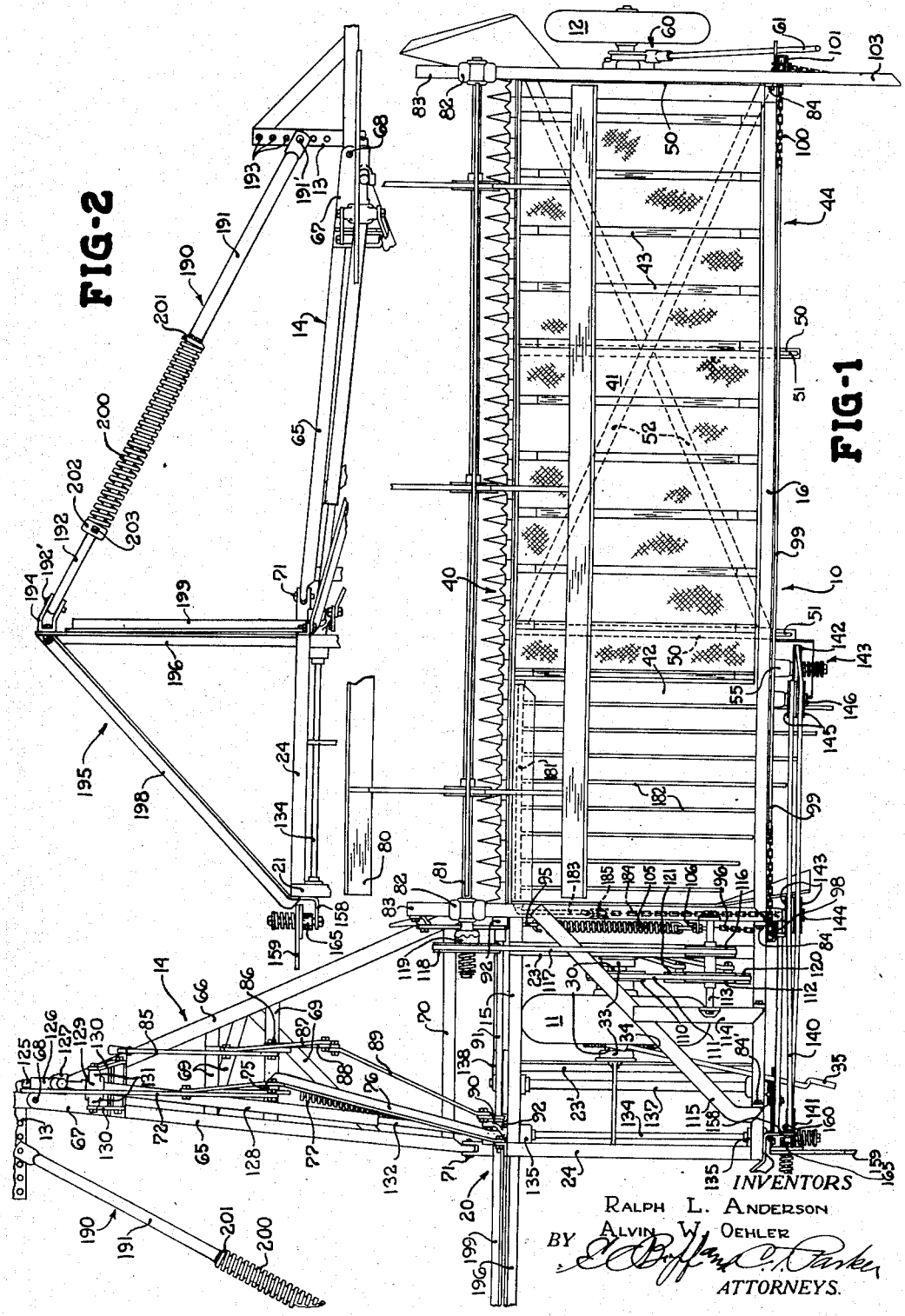
INVENTORS
RALPH L. ANDERSON
ALVIN W. OEHLER
BY
ATTORNEYS.

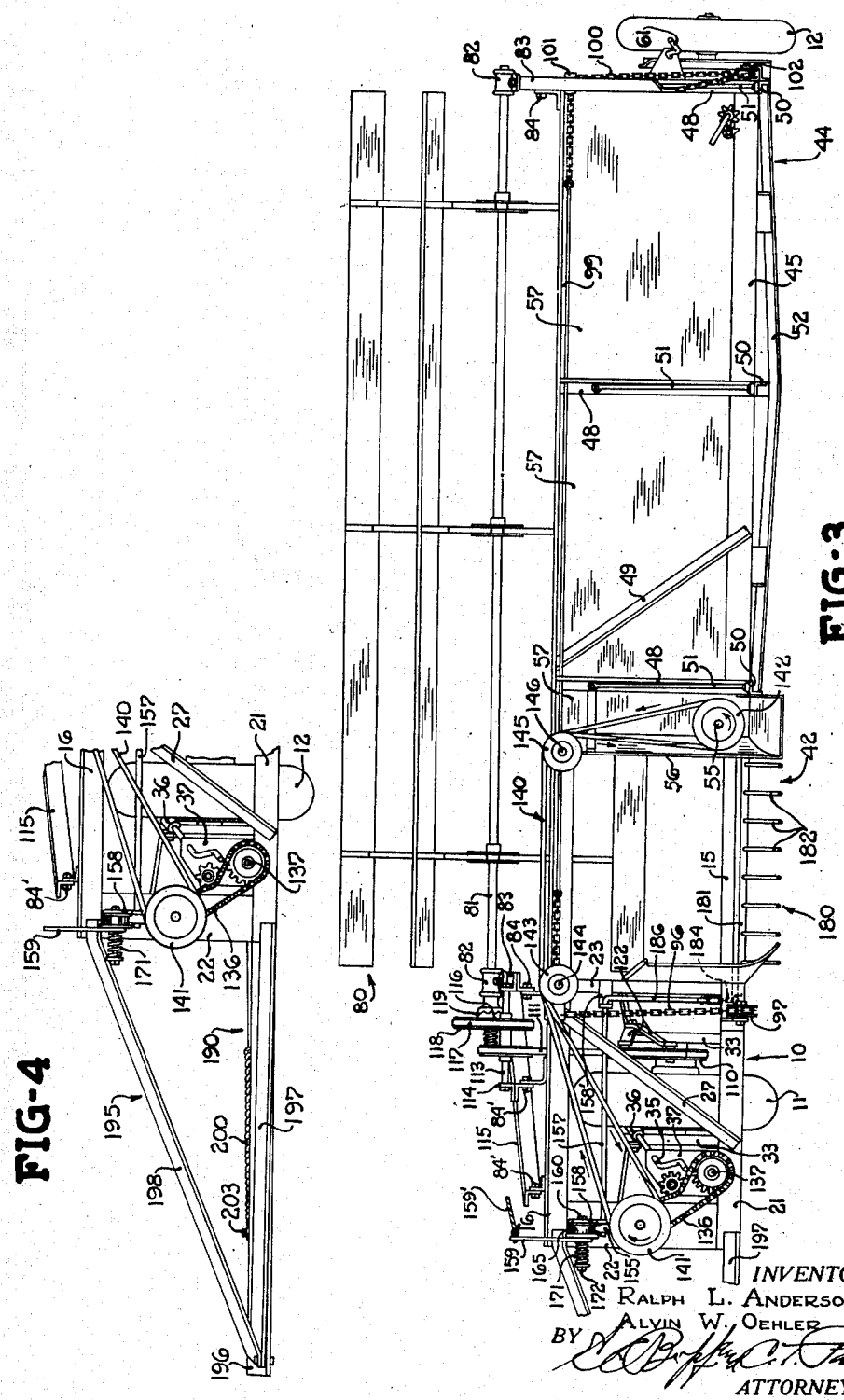

INVENTORS
RALPH L. ANDERSON
ALVIN W. OEHLER
ATTORNEYS.

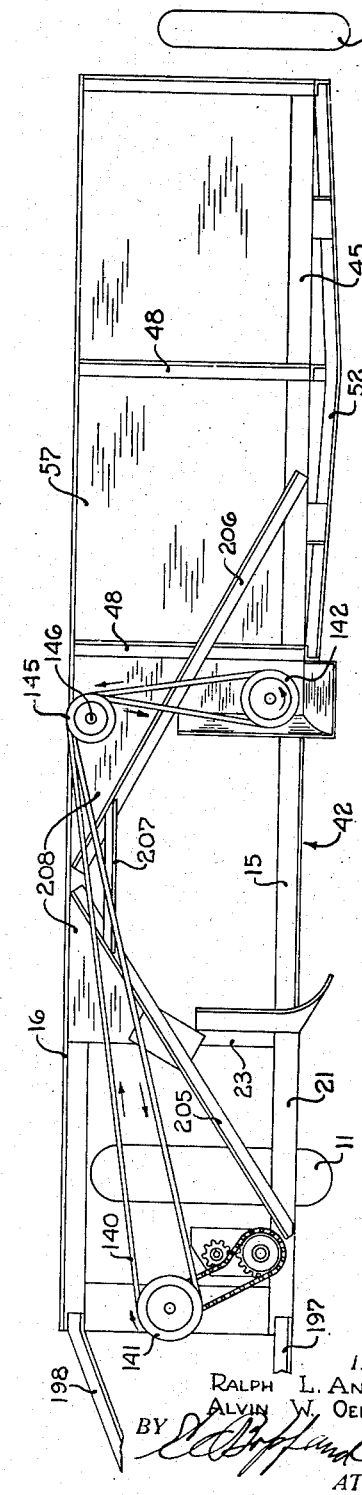

Patented Apr. 28, 1942

2,281,059

UNITED STATES PATENT OFFICE 2,281,059

WINDROW HARVESTER

Ralph L. Anderson and Alvin W. Oehler, Moline, Ill., assignors to Deere & Company, Moline, Ill., a corporation of Illinois Application June 30, 1939, Serial No. 282,026

9 Claims. (Cl. 56—23)

The present invention relates generally to agricultural implements and more particularly to windrow harvesters, and has for its principal object the provision of an improved windrow harvester, light in weight but strong and durable. Another object relates to the provision of a windrow harvester frame having a crop discharge opening of increased area, but without sacrifice of strength or durability. In the accomplishment of this object, the harvester platform is supported at its inner end solely upon the front transverse beam and the upper rear transverse beam without the use of arched construction over the opening, as in the prior art. Additional rigidity is obtained by diagonal cross braces in the platform frame.

Another object relates to the provision of simplified means for driving the platform conveyor. A more specific object is the provision of a power transmitting connection from the power take-off shaft of a tractor to the platform conveyor for driving the latter in a direction of rotation opposite to that of the power take-off shaft but without the use of reversing gears and other expensive equipment. In accomplishing this object we have employed a belt drive connection from a pulley on the driving shaft to a pulley on the driven shaft, the two runs of the belt being carried over one or more pairs of idlers mounted on a common axis, the belt being crossed or reversed between the idlers and one of the pulleys so that the pulleys rotate in opposite directions.

Still another object relates to the provision of manual control means by which the platform can be stopped and the grate or catcher in the discharge opening can be simultaneously interposed when the windrower begins making a turn at the end of the field and then after the turn has been completed, the platform drive can be restored simultaneously with the retraction of the grate. By this means, the harvesting is continuous but the discharging of the crop into a windrow is discontinued during the turns so that when the crop is gathered the tractor need not run over a windrow. A related specific object has to do with a rope controlled device by which one pull on the rope stops the conveyor and raises the grate, and the next pull on the rope starts the conveyor and lowers the grate.

A further object relates to the provision of simplified and improved mechanism for adjusting the height of the reel by means of an adjusting lever on the hitch frame and which is connected to both ends of the reel but which is not appreciably affected by adjustments of the windrower frame relative to the hitch frame.

A further object relates to the provision of bracing means associated with the hitch, which has the effect of counteracting the drag on the grainward end of the frame and maintains the latter substantially perpendicular to the line of advance. A related object has to do with the provision of a limited amount of yielding of the bracing means in order to facilitate turning of corners.

These and other objects and advantages will be apparent after a consideration of the following description in which reference is had to the drawings appended hereto, in which:

Figure 1 is a plan view of a windrow harvester embodying the principles of the present invention and in which a small portion of the frame extension at one end of the implement is broken away;

Figure 2 is a complete plan view of the frame extension showing the yieldable bracing means for holding the main frame substantially perpendicular to the direction of travel of the implement;

Figure 3 is a rear elevation of the windrow harvester in which a portion of the frame extension at one end is broken away;

Figure 4 is a fragmentary rear elevation of one end of the windrow harvester showing the complete frame extension including the bracing means illustrated in Figure 2;

Figure 7 is a rear elevation of a modified form of the harvester frame in which a portion of the frame extension at one end is broken away.

Figure 5:
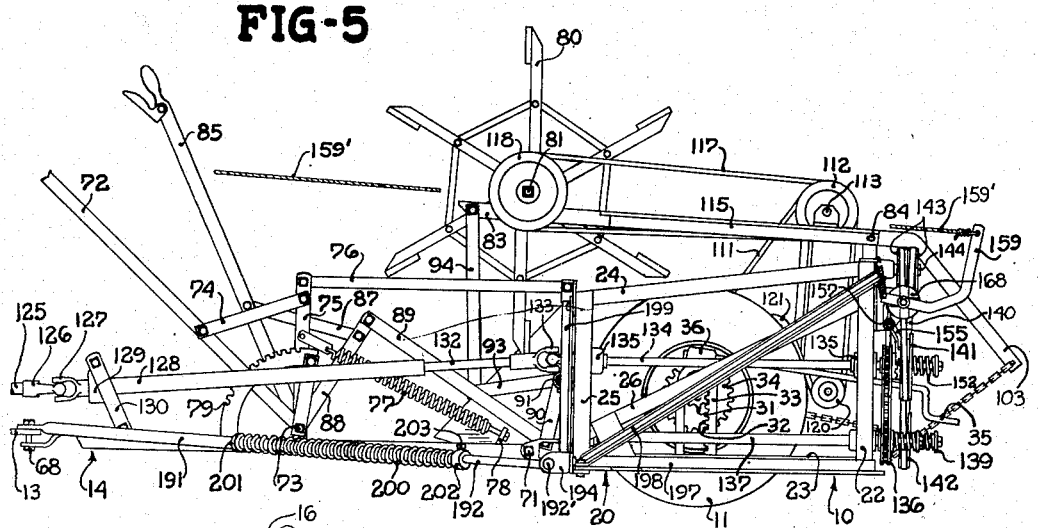
Figure 5 is a side elevation of the windrow harvester as viewed from the stubbleward end of the implement.

Referring now to the drawings, the windrow harvester, or windrower, comprises a generally transversely disposed frame structure 10 supported on a pair of laterally spaced ground wheels 11, 12, and adapted to be drawn by a tractor or other suitable draft device, as illustrated by the drawbar 13 to which the windrower frame is connected by a suitable hitch 14. The windrower frame comprises a front transverse beam 15 and a rear upper transverse beam 16 extending substantially the entire width of the frame.

At the stubbleward end of the windrower frame is provided a box-like wheel supporting frame 20 which includes a lower rear transverse beam 21 disposed beneath the stubbleward portion of the upper rear transverse beam 16 and connected thereto by vertical frame members 22, 23, fixed to opposite ends of beam 21, respectively. The wheel supporting frame 20 further includes a plurality of fore and aft extending frame members 23' connected between the front transverse beam 15 and the lower rear transverse member 21, and an upper fore and aft extending frame member 24 connected between the upper rear transverse beam 16 and a vertical member 25 which extends upwardly from the forward transverse beam 15. Suitable diagonal bracing members 26, 27 are provided in the side and rear of the wheel supporting frame structure 20 for bracing the latter. The stubbleward supporting wheel 11 is journaled on a short axle 30 which is supported for vertical adjustment relative to the frame 20 by more or less conventional adjusting means which consist briefly of gears 31, disposed on opposite ends of the axle, and engaging racks 32 formed on one of the inside surfaces of a pair of inverted U-shaped supports 33, respectively. An adjusting gear 34 is also mounted on the axle 30. Both ends of the axle 30 are simultaneously raised or lowered by means of a manually operated adjusting crank 35 which is connected at its forward end to a worm (not shown) disposed in a housing 36. The worm is in operative engagement with the worm gear 34 so that rotation of the crank 35 causes rotation of the axle 30, which in turn causes the gears 31 to roll up or down with respect to the rack 32. The crank 35 is loosely supported in a plate 37 to accommodate swinging movement thereof as the worm housing 36 travels vertically relative to the frame with the wheel 11. The U-shaped supports are mounted on two of the fore and aft extending frame members 23'.

A conventional cutter bar and reciprocating sickle, indicated generally by the reference numeral 40, extends from the wheel supporting frame 20 to the grainward end of the windrower frame and is supported on the front transverse beam 15. The cutter bar performs the usual function of severing the grain from the field, after which the grain is deposited on a transversely moving canvas platform conveyor 41 which moves the grain in a stubbleward direction toward the left, as viewed in Figure 1, and discharges it into an opening 42 in the frame 10 to form a windrow. The grain that is cut directly in front of the frame opening 42, falls directly into the latter. The platform conveyor 41 comprises an endless canvas having slats 43 fixed thereto, and is wound about a pair of rollers (not shown) which are rotatably mounted at opposite ends of the rectangular platform frame, indicated generally by reference numeral 44. The platform frame 44 includes a lower rear transverse beam 45 disposed below the grainward portion of the upper rear transverse beam 16 and connected thereto by means of vertical frame members 48 and braced by one or more diagonal braces 49. The lower rear beam 45 extends from the grainward end of the windrower frame and terminates at the grain discharge opening 42. The lower rear beam 45 is connected with the front transverse beam 15 by a plurality of fore and aft extending frame members 50, the latter being extended rearwardly beyond the lower rear beam 45 to provide a footing for braces 51 which extend upwardly and forwardly and connected to the vertical frame members 48.

The inner roller in which the canvas is mounted, is fixed to a shaft 55 which is suitably journaled at its forward end on the transverse beam 15 and at its rearward end on the lower rear beam 45 adjacent the inner end thereof. A vertical frame member 56 extends from the inner end of the lower rear beam 45 upwardly to the upper rear beam 16. Sheet metal panels 57 are supported between the upper and lower rear members and extend from the grainward end of the frame inwardly and terminate at the vertical frame member 56 to provide a back board. Thus there is an unobstructive opening in the back board of the windrower between the rear vertical frame members 23 and 56, which opening extends unobstructedly to the upper rear transverse beam 16. Hence the entire platform portion of the windrower is supported at its inner end entirely by the front transverse beam 15 and the upper rear transverse beam 16, and thus providing a maximum size of crop discharge opening and thereby minimizing the possibility of grain clogging in the opening.

Heretofore it has been the general practice to construct windrowers with some form of arch or truss construction above the discharge opening in the back board, in order to obtain a strong and rigid platform frame. We have found, however, that this arch or truss construction can be eliminated to provide the maximum size discharge opening if the rectangular frame is properly braced, and to this end we have provided diagonal cross braces 52 between diagonally opposite corners of the rectangular platform frame 44, and experience has proven that with this construction the windrower frame is fully as rigid, if not more so, than the frames of the prior art. The grainward end of the windrower is supported on the grainward wheel 12 by adjustable means 60 of any suitable type such as the pinion and rack mechanism described in connection with the stubbleward wheel 11. A manually operated adjusting crank 61 is provided for actuating the adjusting mechanism 60.

The tractor hitch 14 comprises a pair of generally longitudinally extending draft beams 65, 66, converging forwardly and fixed to a coupling plate 67 which is adapted to be pivotally connected by a bolt 68 to the draft device 13. The laterally spaced rear ends of the draft members 65, 66 are interconnected by a transverse frame member 70 and intermediate braces 69 to form a rigid frame which is pivotally connected for movement about a transverse axis to the forward end of the windrower frame by aligned pivot bolts 71. With the forward end of the hitch 14 supported on the draft member 13, the windrower frame can be tilted to raise and lower the cutter bar 40 by means of an adjusting lever 72 pivotally mounted at 73 on the hitch 14 and connected by a link 74 to a second lever 75 which is also pivoted at 73 on the hitch 14. The lever 75 is connected to the upper forward corner of the wheel supporting frame 20 by means of a connecting link 76. A counterbalancing spring 77 is connected between the lever 75 and a lug 78 which is fixed to the hitch frame 14. A notched sector 79, also mounted on the hitch frame 14, is adapted to be engaged by suitable latch mechanism (not shown) on the lever 72 to hold the frame in adjusted position.

A harvester reel 80, including a reel shaft 81, is journaled in suitable bearings 82 on a pair of supporting arms 83 which are pivoted to the upper rear transverse beam 16 by means of pivot bolts 84. The reel is swung about the axis of the bolts 84 by means of a hand lever 85 pivotally connected by a bolt 86 to one of the braces 69 on the hitch 14. The reel adjusting lever 85 is connected by a link 87 to a second lever 88 pivoted on the bolt 86 and connected by second link 89 to an arm 90 which is fixed to a transverse rock shaft 91 journaled in laterally spaced bearings 92 on the wheel supporting frame 20. A second arm 93 fixed to the rock shaft, is connected by a link 94 to the forward end of the inner reel supporting arm 83. A third arm 95 on the rock shaft 91, best shown in Figure 1, is connected to a chain 96 which extends rearwardly therefrom and is trained upwardly over an idler 97 journaled on the lower rear beam 21 from which the chain extends upwardly to a second idler 98 from which the chain 96 extends outwardly and is connected to a rod 99 which extends across the rear of the backboard. The outer end of the rod 99 is connected to a chain 100 which is trained downwardly over the idler 101 to a lower idler 102 (Figure 3) from which the chain 100 extends rearwardly and upwardly to a connection with the rearward extension 103 of the grainward reel supporting arm 83. Hence, a movement of the hand lever 85 is transmitted from the rock shaft 91 simultaneously to both the reel supporting arms 83 at opposite ends of the reel 80, thus insuring uniform distance between the reel 80 and the cutter bar 40 across the width of the windrower. Since the pivot connection between the link 89 and arm 90 is substantially coaxial with the pivot bolts 71, about which the tractor hitch 14 pivots with respect to the windrower frame, any tilting movement of the latter by the lever 72 does not disturb the setting of the reel above the cutter bar. A counterbalancing spring 105 is connected between the arm 95 and a lug 106 fixed to the windrower frame.

The reel is driven from the stubbleward ground wheel 11 by means of a pulley 110 fixed to the wheel 11 and rotatable therewith. The pulley 110 is connected by a belt 111 to a second pulley 112 journaled on a shaft 113 which is supported at one end thereof on the inner reel supporting arm 83, and at the opposite end thereof on a member 114 which is fixed at its forward end to a frame member 115 which converges to a point of connection with the reel arm 83. The rear ends of the frame members 114 and 115 are pivoted by means of bolts 84' to the upper rear beam 16, coaxial with the pivot bolts 84 of the reel supporting arms 83. A third pulley 116 is rotatably mounted on the shaft 113 and driven by the pulley 112 and is connected by means of a belt 117 to a pulley 118 mounted on the reel supporting shaft 81 and connected thereto through a slip clutch device 119 which is adapted to slip should the reel encounter an obstruction such as a rock or stump in the field. It will be noted that the interconnected pulleys 112, 116 are journaled on the reel supporting arm 83 and adapted to swing vertically with the latter when the reel is adjusted. The shaft 113 is mounted as near as possible to the axis of the bolts 84, 84' to minimize the variation in distance between the shaft 113 and the axis of the wheel 11. However, in order to maintain the belt 111 tight and allow for this change of distance, a pair of belt tightening pulleys 120, 121, are held in contact with the belt 111 by supporting arms 122 which are adjustably mounted on the rack member 33.

The platform conveyor 41 and the cutter bar 40 obtain power from the power take-off shaft 125 of the tractor which is connected by means of a detachable coupling 126 through a universal joint 127 to a tubular shaft 128 journaled in a bearing 129, which is supported on the hitch 14 by links 130 which are pivoted to a pair of trunnions 131, extending from opposite sides of the bearing 129, and thus allowing fore and aft movement of the tubular shaft 128 as the tractor tilts relative to the hitch 14. The tubular shaft 128 is slidably connected to a shaft 132 which telescopes within the tubular shaft but is non-rotatable relative thereto. The shaft 132 is connected by a universal joint 133 to a power shaft 134 rotatably journaled in bearings 135 which are mounted on the frame members 22 and 25. The shaft 134 is connected by a chain and sprocket connection 136 to drive the cutter bar through a forwardly extending shaft 137 journaled in suitable bearings in the frame 20 and having at its forward end a suitable pitman connection 138 with the sickle. The inner roller of the platform conveyor 41 is driven by means of a belt 140 preferably of the V-belt type which is trained over a driving pulley 141 on the rear end of the power shaft 134, and over a driven pulley 142 on shaft 55 on which the roller is mounted. The pulley 142 is connected to the shaft 55 through a conventional slip clutch mechanism, indicated generally by reference numeral 139, for the purpose of interrupting the drive in case the conveyor is stuck. Both runs of the belt 140 are carried up over a pair of idlers 143 journaled coaxially side by side on a supporting shaft 144, but adapted to rotate independently in opposite directions. The shaft 144 is suitably fixed to the upper rear beam 16 at one of the upper corners of the opening in the backboard. A second pair of idlers 145 is mounted on a stub shaft 146 at the opposite corner of the grain discharge opening and the two pairs of idlers 143, 145 serve to carry the two runs of the belt 140 over the grain discharge opening.

Inasmuch as the power take-off shafts of most tractors run in a clockwise direction when viewed from the rear, it is necessary to obtain a reversal of direction between the power shaft 134 and the platform pulley 142. This is conveniently accomplished by reversing the belt 140 between the idlers 145 and the pulley 142, as best shown in Figure 3. The arrows show the direction of rotation of the pulleys 141, 142 and the direction of travel of the runs of the belt 140. In order that the V-belt seats properly in the idlers 143, 145, that is to say, with the sides of the belt converging downwardly, the lower run of the belt is twisted one-half turn between the idlers 143 and the driving pulley 141, while a similar twist is applied in one of the runs of the belt between the idlers 145 and the pulley 142, as indicated. This belt drive provides a very simple and inexpensive driving connection to the platform conveyor and eliminates the necessity of bevel gears.

Figure 6:
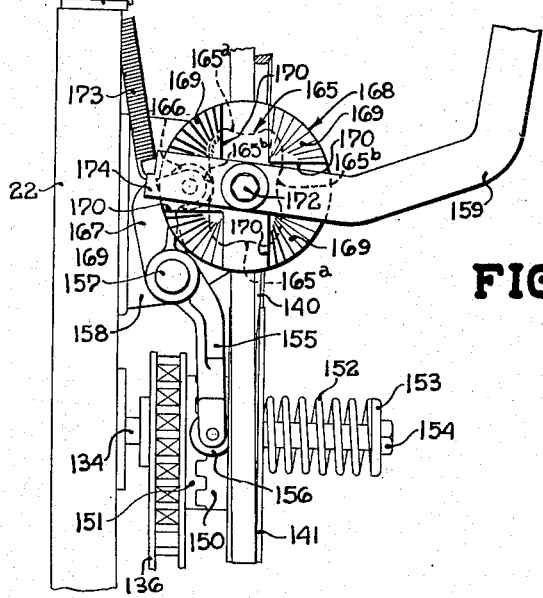
Figure 6 is a side elevation drawn to a larger scale, of the mechanism for simultaneously controlling the drive to the platform conveyor and the crop catcher grate in the crop discharge opening.

Referring more particularly to Figure 6, the driving pulley 141 is connected to the power shaft 134 through a manually operated clutch comprising a jaw clutch element 150 connected to the drive pulley 141 and adapted to coact with a second jaw clutch element 151 fixed to the shaft 134. The pulley 141 is slidable axially on the shaft 134 and is yieldably held in the connected position of the clutch by means of a compression spring 152 acting between the pulley 141 and a washer 153 held at the end of the shaft 134 by a bolt 154. The pulley is moved axially outwardly to disengage the clutch elements 150, 151, by means of an arm 155 having a roller 156 journaled at its outer end and adapted to bear against the side of the pulley 141. The arm 155 is fixed to a rock shaft 157, one end of which is journaled in a bracket 158 fixed to the vertical frame member 22, the other end being rockably supported in a bracket 158' fixed to the vertical frame member 23 adjacent the crop discharge opening.

The rock shaft 157 is rocked by means of a lever 159 pivoted on a bolt 160 which is supported on the bracket 158. A generally rectangular cam 165 is journaled on the bolt 160 between the bracket 158 and the lever 159. Engaging this cam is a cam following roller 166, journaled on an arm 167 fixed to the rock shaft 157 and preferably cast integrally with the clutch control arm 155. Each of the short sides of the rectangular cam 165, is provided with a shallow recess 165a adapted to receive the cam following roller 166, and each of the long sides of the cam is provided with a shallow recess 165b. Thus in one revolution of the cam 165, there are four normal seating positions of the roller 166 and as the cam is rotated from each position to the succeeding position, the arm 167 is reciprocated between two angularly spaced positions. This reciprocating movement is transmitted through the arm 155, effecting opening and closing movements of the clutch jaw 150 relative to the clutch member 151, and at the same time rocking the rock shaft 157 for purposes which will be explained later. The cam 165 is rotated by the lever 159 through the medium of a notched disk member 168 preferably formed integrally with the cam 165 and rotatable with the latter about the bolt 160. The disk 168 is thus positioned between the cam 165 and the lever 159, and its face adjacent to the lever 159 is formed with four thickened portions 169, each of which terminates in a shoulder 170. The four shoulders 170 are parallel to four radii of the disk 168 spaced 90 degrees apart, but are offset from the latter a distance of half the width of the lever 159 in order that the upper edge of the lever 159 may be brought into abutment with each of the shoulders 170, successively, the shoulders 170 being disposed in overlapping relation to the lever 159 when the latter is held against the face of the disk by means of a compression spring 171 which is coiled about the bolt 160 and reacts against a securing nut 172. Each of the raised portions 169 is inclined from the shoulder 170 toward the surface of the disk and merges with the latter along a line substantially 90 degrees with respect to the shoulder 170, as best illustrated in Figure 6. It will now be understood that by pulling the lever 159 forwardly about the axis of the bolt 160 preferably by means of a rope 159' under control of the tractor operator, the upper edge of the lever will engage the adjacent shoulder 170 of the disk 168, thereby moving the disk and cam 165 with the lever 159 as the roller 166 on the arm 167 rolls from the notch 165b in one of the long sides of the cam to the notch 165a in one of the short sides of the cam, and thus moving the clutch from connected to disconnected positions or vice versa. When the lever 159 is released, it is returned to normal position by means of a spring 173 which is connected between the upper rear transverse beam 16 and an extension 174 of the lever 159. As the lever returns to normal position, it is cammed outwardly by inclined surface of the raised portion 169 against the action of the spring 171 until it clears the edge of the succeeding shoulder 170, whereupon the spring 171 forces the lever under the shoulder and ready for another actuation. Thus it is now clear that successive forward actuations of the lever, alternately open and close the clutch members 150, 151.

Within the crop discharge opening 42, is disposed a generally horizontal crop catcher 180 in the form of a grate comprising a transversely disposed head 181 mounted on the front transverse beam 15 by means providing for rocking movement about a transverse axis. Fixed to the head 181 and extending rearwardly therefrom, is a plurality of laterally spaced grate bars 182 which extend across the opening in the platform portion of the windrower frame. By rocking the head, the grate bars can be moved between a lowered position in which the ends of the bars nearly scrape the ground, and a raised position in which the grate bars 182 incline upwardly and rearwardly. In the lowered position of the grate, the harvested crop from the cutter bar 40 and from the platform conveyor 41, falls upon the stubble which extends upwardly beyond the grate bars. The stubble engages the crop and allows the grate bars to withdraw therefrom as the implement moves forwardly, thereby leaving the crop in a windrow. When the grate is raised, however, the bars 182 are disposed above the stubble and therefore retain the crop discharged upon it from the cutter bar and from the platform conveyor. It is desirable to raise the grate and stop the platform conveyor while the implement is making a turn in order to provide a clear space for the tractor and harvesting implement at a later time when the windrowed crop is gathered. To this end, therefore, the grate head 181 is provided with a rearwardly extending arm 183, best shown in Figure 1. To this is connected a chain 184 which extends upwardly to a pulley 185 fixed to the frame, and then rearwardly to a connection with a downwardly extending arm 186 on the end of the rock shaft 157. By this means when the lever 159 is pulled forwardly, not only is the clutch 150 disengaged to stop the platform conveyor 41, but the rocking of the rock shaft 157 acts through the arm 186 and chain 184 to raise the grate 180. During the turn the drive to the cutter bar is, of course, not interrupted and therefore the harvested grain merely falls upon the stationary conveyor 41 and the raised grate 180, but after the turn is completed, the operator actuates the lever 159 a second time, which lowers the grate and starts the conveyor 41 once more and thus discharges the accumulated crop through the discharge opening 42.

Due to the fact that the hitch 14 is offset toward one end of the windrower frame, there is a tendency for the grainward end of the frame to lag behind and this tendency is even more pronounced when a left turn is made. To counteract this tendency to lag behind, a bracing member 190 is provided. The bracing member 190 comprises a tubular member 191 pivotally connected at its forward end by a bolt 191' to any of a row of optionally selected apertures 193 in the tractor drawbar or draft device 13. A bar 192 is telescoped within the tubular member 191 and is connected by a pivot bolt 192' for vertical swinging movement to a clevis 194 which is connected to the outer end of an extension 195 to the windrower frame. The frame extension 195 includes a beam 196 extending laterally in a stubbleward direction beyond the hitch 14 and in alignment with the front transverse beam 15, a rearwardly and inwardly extending brace 197 connected between the outer end of the beam 196 and the stubbleward end of the lower rear beam 21, a rearwardly and upwardly extending brace 198 from the outer end of the beam extension 196 to the end of the upper rear transverse beam 16 and an upwardly inclined brace 199 extending from the outer end of the beam extension 196 and connected near the upper end of the vertical frame member 25. Resilient means are provided for exerting a force tending to extend the telescoping brace 190 in the form of a compression spring 200 coiled about the telescoping members 191, 192 and reacting at its forward end against a flange 201 welded to the tubular member 191, and at its rearward end against a collar 202 slidable along the bar 192 and fixed in any position of adjustment by a set screw 203. Thus it is evident that by properly adjusting the pressure of the spring 200, sufficient force will be exerted between the draft device 13 and the outer end of the frame extension 195 to counteract the tendency of the opposite end of the frame to lag behind. When the tractor makes a left turn, the pivotal movement of the drawbar 13 with respect to the hitch 14, will cause a further compression of the spring 200, which will assist in preventing the opposite end of the windrower from lagging behind during the turn. The brace 190 swings vertically with respect to the windrower frame 10 together with the hitch 14 by virtue of the pivot bolt 192' which is practically in alignment with the hitch pivots 71.

Figure 7 shows a modified form of the windrower frame employing a novel form of arched construction in the backboard over the crop discharge opening. In this embodiment a pair of bracing beams 205, 206 are disposed in upwardly converging relation from the lower rear beams 21, 45, on opposite sides of the crop discharge opening, respectively, and fixed at their upper ends to the upper rear transverse beam 16 substantially over the center of the opening. A horizontal brace 207 is disposed below the upper rear beam 16 and interconnects the converging beams 205, 206 near their upper ends, and defines the upper end of the opening in the rear of the windrower frame. An arched panel 208 is fixed between the converging beams 205, 206, and the upper beam 16.

In this embodiment a single pair of belt idlers 145 are journaled on a common axis for the purpose of carrying the two runs of the belt 140 over the opening. In this case, however, as in the above described embodiment, the belt is reversed between the driving pulley 141 and the driven pulley 142.

What we claim as our invention and desire to secure by Letters Patent, is:

1. In a windrower, a transverse wheel supported frame structure having an opening for discharging harvested crops into a windrow, said frame structure comprising a front transverse beam and a rear upper transverse beam extending substantially the entire width of the structure, a lower rear beam disposed below said upper rear beam and extending from the outer end of said frame structure to said crop discharge opening, a backboard extending between said upper and lower rear beams, there being an unrestricted opening in the frame rearwardly of said front beam and beneath said upper rear beam, a cutter bar mounted on said frame, and a platform conveyor for moving said crops from said cutter bar to said discharge opening, means for driving said conveyor including a drive shaft mounted on the frame at one side of said discharge opening for rotation about a fore and aft extending axis, a driving pulley mounted on said shaft, a driven pulley associated with said conveyor and mounted on the frame on the opposite side of said discharge opening from said driving pulley, a power transmitting belt trained over said pulleys, and a pair of idler pulleys disposed side by side on said upper transverse beam above said discharge opening and journaled for independent rotation on a common axis, the two runs of said power transmitting belt being trained over said idler pulleys, respectively.

2. In a windrower having a transverse frame, a pair of laterally spaced ground wheels journaled thereon, a cutter bar mounted on said frame, a tractor hitch pivoted to said frame near one end thereof for swinging movement about a transverse axis, and control means for adjustably fixing said hitch relative to said frame in selected positions of angular adjustment, a reel supporting frame pivotally connected to said transverse frame providing for vertical swinging movement relative thereto, a control member mounted on said hitch for controlling said vertical swinging movement of said reel frame, and connections between said control member and said reel frame comprising a rocking member mounted for rocking movement about an axis adjacent said pivot axis of said tractor hitch, and pivot means connecting said rocking member with said control member and said reel frame, one of said pivot means being disposed substantially coaxial with said pivot axis of the tractor hitch.

3. In a windrower having a transverse frame, a pair of laterally spaced ground wheels journaled thereon, a cutter bar mounted on said frame, a tractor hitch pivoted to said frame near one end thereof for swinging movement about a transverse axis, and control means for adjustably fixing said hitch relative to said frame in selected positions of angular adjustment, a reel supporting frame pivotally connected to said transverse frame providing for vertical swinging movement relative thereto, a control lever pivotally mounted on said hitch, means for locking said lever in adjusted position, a transversely disposed rock shaft journaled on said frame adjacent said transverse pivot axis of said hitch, a connection between said rock shaft and said lever, and a connection between said rock shaft and said reel frame, one of said connections comprising a pivot disposed substantially on said transverse axis of the tractor hitch.

4. In a windrower having a transverse frame, a pair of laterally spaced ground wheels journaled thereon, a cutter bar mounted on said frame, a tractor hitch pivoted to said frame near one end thereof for swinging movement about a transverse axis, and control means for adjustably fixing said hitch relative to said frame in selected positions of angular adjustment, a reel supporting frame pivotally connected to said transverse frame providing for vertical swinging movement relative thereto, a control lever pivotally mounted on said hitch, means for locking said lever in adjusted position, a tranversely disposed rock shaft journaled on said frame adjacent said transverse pivot axis of said hitch, connections between said rock shaft and said lever and the adjacent end of said reel frame, one of said connections comprising a pivot disposed substantially on said transverse axis of the tractor hitch, and a flexible connecting member connected to said rock shaft and trained over pulleys mounted on said frame and connected to the opposite end of said reel shaft.

5. In a windrower comprising a transverse frame having an opening therein for discharging harvested crops into a windrow, a cutter bar mounted on the frame and a conveyor for moving crops from said cutter bar to said opening, means for driving said conveyor including a power shaft, a disengageable clutch driven thereby, and driving connections from said clutch to said conveyor, a crop catcher in said opening and adapted to move between crop retaining and crop discharging positions, and control mechanism including a rocking member, connections between said rocking member and said clutch and said catcher, a rotatable control member connected to said rocking member to rock the latter upon rotation of the former, and a ratchet mechanism including a reciprocable lever adapted to engage said control member when the lever is moved in one direction, the return movement of the lever being independent of said control member, and a rope connected to said lever and under control of the operator, whereby one actuation of said rope effects a disconnection of said clutch and a retraction of said catcher, and a successive actuation of said rope effects a reconnection of said clutch and an interposition of said catcher.

6. In a windrower, a transverse frame having an opening in the bottom and rear thereof for discharging harvested crops into a windrow, said frame comprising a front transverse beam and a rear upper transverse beam extending substantially the entire width of said frame, wheel supporting frame members disposed at one end of said transverse frame and connected between said front beam and said upper rear beam, a lower rear beam disposed below said upper rear beam and extending from the other end of said transverse frame to said crop discharging opening, fore and aft extending frame members at opposite ends, respectively, of said lower rear beam and connected between the latter and said front beam to form a rectangular platform frame, a ground wheel journaled at the outer end of said frame, vertically extending frame members extending from opposite ends, respectively, of said lower rear beam to said upper rear beam, a back board extending between said vertical frame members and between said upper and lower rear beams, there being an unrestricted opening in said frame rearwardly of said front beam and beneath said upper rear beam, between the inner vertical frame member and said wheel supporting frame, a transverse platform conveyor for moving crops to said opening, and means for driving said conveyor comprising a drive shaft mounted on said frame at one end of said discharge opening below said upper beam, a driven pulley associated with said conveyor and mounted on the lower portion of said frame at the opposite side of said discharge opening from said driving pulley, a power transmitting belt trained over said pulleys, and two pairs of idler pulleys, each pair being disposed side by side and journaled for independent rotation on a common axis, said pairs of pulleys being supported on said upper beam adjacent opposite sides of said discharge opening, respectively, each of the two runs of said belt being trained over a pulley of each of said pairs of pulleys to hold the belt above the lower edge of said beam.

7. A windrower frame comprising, in combination, a front transverse beam and a rear upper transverse beam extending substantially the entire width of the frame, a wheel supporting frame at one end thereof comprising frame members connected between said beams, a lower rear beam disposed below said upper rear beam and extending from the other end of the windrower frame to a point spaced from said wheel supporting frame to provide an opening through which harvested crops are discharged into a windrow, a vertical and a fore and aft extending frame member connected between the inner end of said lower rear beam and said front beam and said upper rear beam, respectively, to define sides of said frame opening, the latter extending unrestrictedly from said front beam to said upper rear beam to provide ample clearance for the discharge of crops, vertical and fore and aft extending frame members connected between the outer end of said lower rear beam and said front beam and upper rear beam, respectively, to provide a platform frame and back board frame, and a pair of diagonal cross braces for stiffening said platform frame, the inner end of the latter being supported solely on said front and upper rear beams.

8. In a windrower having a transverse wheel supported frame structure having an opening for discharging harvested crops into a windrow, a cutter bar mounted on said frame, and a platform conveyor for moving said crops from said cutter bar to said discharge opening, means for driving said conveyor including a drive shaft mounted on the frame at one side of said discharge opening for rotation about a fore and aft extending axis, a driving pulley mounted on said shaft, a driven pulley associated with said conveyor and mounted on the frame on the opposite side of said discharge opening from said driving pulley, a pair of idlers mounted on said frame on each side of said opening, each pair being journaled for independent rotation about a common axis, and a power transmitting belt trained over said pulleys, each of the two runs of the belt being carried over one of each of said pairs of idlers, respectively.

9. In a windrower having a transverse wheel supported frame structure having an opening for discharging harvested crops into a windrow, a cutter bar mounted on said frame, and a platform conveyor for moving said crops from said cutter bar to said discharge opening, means for driving said conveyor including a drive shaft mounted on the frame at one side of said discharge opening for rotation about a fore and aft extending axis, a driving pulley mounted on said shaft, a driven pulley associated with said conveyor and mounted on the frame on the opposite side of said discharge opening from said driving pulley, a pair of idlers mounted on said frame on each side of said opening, each pair being journaled for independent rotation about a common axis, and a power transmitting belt trained over said pulleys, each of the two runs of the belt being carried over one of each of said pairs of idlers, respectively, said belt being reversed between one of said pairs of idlers and the adjacent pulley, whereby the driven pulley is rotated in the opposite direction to that of said driving pulley.

RALPH L. ANDERSON.
ALVIN W. OEHLER.